(12) United States Patent
Millet et al.

(10) Patent No.: US 11,511,638 B2
(45) Date of Patent: Nov. 29, 2022

(54) ELECTRICAL POWER CONVERTER UNIT, AN ELECTRICAL POWER CONVERSION DEVICE AND AN INDUSTRIAL VEHICLE INCLUDING THIS ELECTRICAL POWER CONVERTER UNIT

(71) Applicants: VOLVO TRUCK CORPORATION, Gothenburg (SE); UNIVERSITE GRENOBLE ALPES, Saint Martin d'Hères (FR)

(72) Inventors: Michael Millet, Moidieu-Détourbe (FR); Christophe Magnet, Solaize (FR); David Frey, Saint Martin d'Hères (FR); Julien Richer, Lyons (FR); Philippe Le Brusq, Communay (FR)

(73) Assignees: VOLVO TRUCK CORPORATION, Gothenburg (SE); UNIVERSITE GRENOBLE ALPES, Saint Martin d'Hères (FR)

( * ) Notice: Subject to any disclaimer, the term of this patent is extended or adjusted under 35 U.S.C. 154(b) by 0 days.

(21) Appl. No.: 17/262,905

(22) PCT Filed: Jul. 25, 2018

(86) PCT No.: PCT/EP2018/070222
§ 371 (c)(1),
(2) Date: Jan. 25, 2021

(87) PCT Pub. No.: WO2020/020457
PCT Pub. Date: Jan. 30, 2020

(65) Prior Publication Data
US 2021/0245613 A1    Aug. 12, 2021

(51) Int. Cl.
*B60L 53/22* (2019.01)
*B60L 53/24* (2019.01)
(Continued)

(52) U.S. Cl.
CPC ............... *B60L 53/22* (2019.02); *B60L 53/24* (2019.02); *H02M 7/797* (2013.01); *B60K 6/22* (2013.01);
(Continued)

(58) Field of Classification Search
CPC .... B60L 53/22; B60L 53/24; B60L 2260/165; B60L 50/20; B60L 53/20; H02M 7/797;
(Continued)

(56) References Cited

U.S. PATENT DOCUMENTS

2007/0170785 A1    7/2007  McCoy et al.
2008/0252149 A1*  10/2008  McCoy .................. H02M 1/10
307/128

(Continued)

FOREIGN PATENT DOCUMENTS

WO    2012116738 A1    9/2012

OTHER PUBLICATIONS

International Search Report and Written Opinion dated Aug. 28, 2018 in corresponding International PCT Application No. PCT/EP2018/070222, 9 pages.

*Primary Examiner* — Toan T Vu
(74) *Attorney, Agent, or Firm* — Venable LLP; Jeffri A. Kaminski (57) ABSTRACT

An electrical power converter unit (2) includes: a first connection interface (10) comprising two leads (12, 14) forming a DC input/output interface for connecting a first electrical device to the power converter unit, a three-phase rectifier power converter circuit (16) and a second connection interface (30) for connecting a second electrical device to the power converter unit. The second connection interface includes a switching unit (46) adapted to switch between:—a DC input/output mode, in which first, second and third arms of the power converter circuit (16) are
(Continued)

electrically connected together, forming one DC input/output; and—an AC input/output mode, in which the arms are disconnected from each other, forming separate input/outputs for a three-phase AC voltage.

15 Claims, 5 Drawing Sheets (51) Int. Cl.
*H02M 7/797* (2006.01)
*B60K 6/22* (2007.10)

(52) U.S. Cl.
CPC ..... *B60L 2260/165* (2013.01); *B60Y 2200/91* (2013.01); *B60Y 2200/92* (2013.01)

(58) Field of Classification Search
CPC .. B60K 6/22; B60Y 2200/91; B60Y 2200/92; Y02T 10/70; Y02T 10/7072; Y02T 90/14
See application file for complete search history.

(56) References Cited

U.S. PATENT DOCUMENTS

| | | | |
|---|---|---|---|
| 2012/0201059 A1* | 8/2012 | Berggren | H02H 7/268 363/53 |
| 2015/0343908 A1* | 12/2015 | Mirzaei | B60L 15/007 290/1 R |
| 2016/0111971 A1* | 4/2016 | Rayner | H02M 3/1584 307/52 |
| 2017/0179745 A1* | 6/2017 | Tritschler | B60L 53/24 |
| 2018/0138730 A1 | 5/2018 | Fuchs et al. | |
| 2018/0278168 A1* | 9/2018 | Brown | H02J 7/022 |

* cited by examiner

ELECTRICAL POWER CONVERTER UNIT, AN ELECTRICAL POWER CONVERSION DEVICE AND AN INDUSTRIAL VEHICLE INCLUDING THIS ELECTRICAL POWER CONVERTER UNIT

CROSS-REFERENCE TO RELATED APPLICATIONS

This application is a U.S. National Stage application of PCT/EP2018/070222, filed Jul. 25, 2018, and published on Jan. 30, 2020, as WO 2020/020457 A1, all of which is hereby incorporated by reference in its entirety.

TECHNICAL FIELD OF THE INVENTION

The present invention relates to an electrical power converter unit, an electrical power conversion device including this electrical power converter unit and an industrial vehicle including this electrical power converter unit.

BACKGROUND OF THE INVENTION

The invention more generally relates to the field of industrial vehicles, especially heavy-duty and medium-duty vehicles, such as trucks, buses and construction equipment. Such an industrial vehicle can be an electric vehicle (including hybrid-electric vehicles and fully electric vehicles) and conventionally include power converters for conditioning the electrical power delivered to electric traction motors, or it can be a conventional vehicle comprising an electrically powered machine, such as a refrigerator unit for a refrigerated truck.

For instance, each type of electric vehicle usually has very specific requirements with regards to the architecture and topology of the power converters. As a consequence, power converters are often produced only in low-volume series, which drives up their production and development costs. In turn, this increases the cost of the vehicle electrical system as a whole and increases the final cost of the vehicle. This increased cost has been identified as hampering the market penetration rate of vehicles, especially of electric vehicles, comprising several power converters.

There is therefore a need for reducing production costs of vehicle electrical systems and of power converters used in these electrical systems in order to decrease the final cost of the vehicle, especially for electric vehicles.

SUMMARY OF THE INVENTION

To that end, embodiments of the invention relate to an electrical power converter unit, including:
- a first connection interface including two leads forming a DC input/output interface for connecting a first electrical device to the power converter unit;
- a three-phase rectifier power converter circuit including:
  - six switches connected by pairs, the pairs of switches being connected in parallel between the two leads of the first connection interface,
  - first, second and third arms each connected to a middle point of a pair of switches;
- a second connection interface for connecting a second electrical device to the power converter unit, the second connection interface including first, second and third connection terminals respectively connected to an end of the first, second and third arms of the power converter circuit;

and the second connection interface includes a switching unit adapted to switch between:
- a DC input/output mode, in which the first, second and third arms of the power converter circuit are electrically connected together, forming one DC input/output terminal; and
- an AC input/output mode, in which the first, second and third terminals of the second connection interface are disconnected from each other, forming separate input/output terminals for a three-phase AC voltage.

The power converter unit can be switched easily between a DC/AC converter mode and a DC/DC converter mode and therefore can be reconfigured depending on user requirements. The power converter can be used as a building block for building larger and more complex power converter devices for replacing costlier low-volume application-specific power converter devices. Since the power converter unit can be used in many different settings, it can be mass-produced in large quantities with a lower per-unit cost.

According to advantageous aspects, embodiments of the invention comprise one or more of the features of dependent claims 2 to 10, considered alone or according to all possible technical combinations.

According to another aspect, embodiments of invention relate to an electrical power conversion device according to any one of claims 11 to 16.

According to yet another aspect, embodiments of invention relate to the industrial vehicle of claim 17.

BRIEF DESCRIPTION OF THE DRAWINGS

The invention will be better understood upon reading the following description, provided solely as an illustrative example, and made in reference to the appended drawings, in which.

DETAILED DESCRIPTION OF SOME EMBODIMENTS

Figure 1:
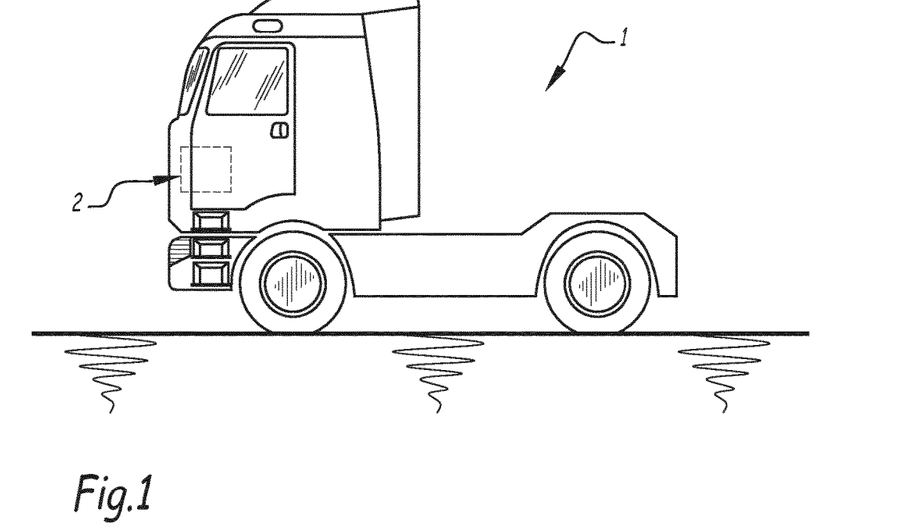
FIG. 1 is a simplified diagram of an industrial vehicle according to embodiments of the invention.

FIG. 1 illustrates an industrial vehicle 1 including an electrical circuit comprising at least one electrical power converter unit 2, or including a power converting device comprising at least one electrical power converter unit 2.

Preferably, the vehicle 1 is an electric vehicle, such as a hybrid-electric vehicle or a fully electric vehicle, i.e. a vehicle including at least one electric traction motor.

In alternative embodiments, the vehicle 1 may be a conventional vehicle comprising an electrically powered machine, such as a refrigerator unit for a refrigerated truck.

According to preferred embodiments, the vehicle 1 is a heavy-duty or medium-duty vehicle. In other embodiments, the vehicle 1 can be any industrial vehicle, preferably a wheeled industrial vehicle, such as a tractor, or a bus, or a dump-truck, or a military ground vehicle, or a heavy-duty construction vehicle such as a loader, a bulldozer, an excavator, a compactor, a scraper of any equivalent vehicle.

Several embodiments of the power converter unit 2 are illustrated in FIGS. 2, 3, 4 and 5.

Figure 2:
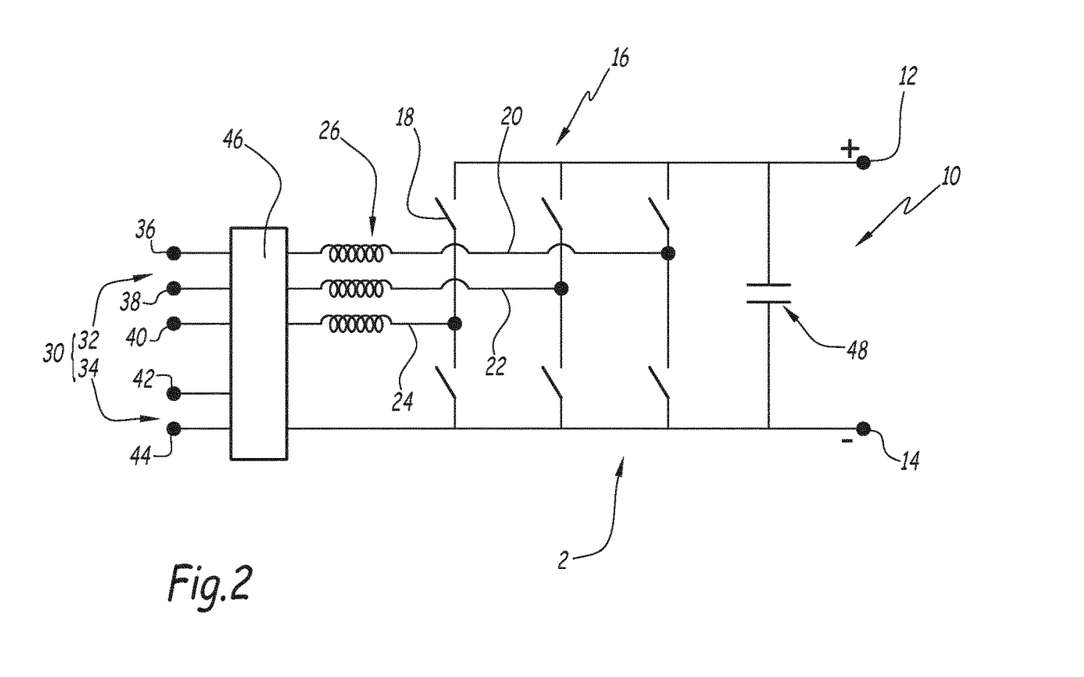
FIG. 2 is an electrical diagram of a power converter unit according to embodiments of the invention.

In many embodiments, the power converter unit 2 includes a first connection interface 10 including two leads 12, 14 forming a DC (Direct Current) input/output interface for connecting a first electrical device (not shown) to the power converter unit 2.

For example, the first electrical device is an electrical load, or an electrical voltage or current source, such as a generator or an energy storage device.

The power converter unit 2 also includes a three-phase rectifier power converter circuit 16 comprising six switches 18 connected in pairs and a first arm 20, a second arm 22 and a third arm 24 each connected to a middle point of a pair of switches 18.

The pairs of switches 18 are connected in parallel between the two leads 12, 14 of the first connection interface 10. In the illustrated example, each arm 20, 22 and 24 also includes an inductance coil 26.

For example, each switch 18 is automatically switched between electrically open and closed states by an electronic control unit (not shown) of the converter circuit 16.

The architecture of the converter circuit 16 is well known and is not described in further detail.

The power converter unit 2 also includes a second connection interface 30 for connecting a second electrical device (not shown) to the power converter unit 2.

In practice, the power converter unit 2 is reversible, meaning that the first electrical device connected to the first interface 10 can act as an electrical source and the second electrical device connected to the second interface 30 can act as an electrical load, or alternatively that the first electrical device can act as a load and the second electrical device can act as a source.

The second connection interface 30 includes a first group 32 of connection terminals and a second group 34 of connection terminals.

The first group 32 includes a first connection terminal 36, a second connection terminal 38 and a third connection terminal 40.

The first terminal 36 is connected to an end of the first arm 20, through a first electrical conductor. The second terminal 38 is connected to an end of the second arm 22 through a second electrical conductor. The third terminal 40 is connected to an end of the third arm 24 through a third electrical conductor. In other words, the first, second and third electrical conductors are respectively connected to arms 20, 22 and 24.

In some embodiments, the second group 34 includes fourth and fifth connection terminals 42 and 44.

The second connection interface 30 also includes a switching unit 46 adapted to switch between a DC input/output mode and an AC input/output mode (Alternating Current).

The second connection interface 30 is therefore adapted to accommodate a second electrical device which can be an AC device or a DC device.

Figure 6:
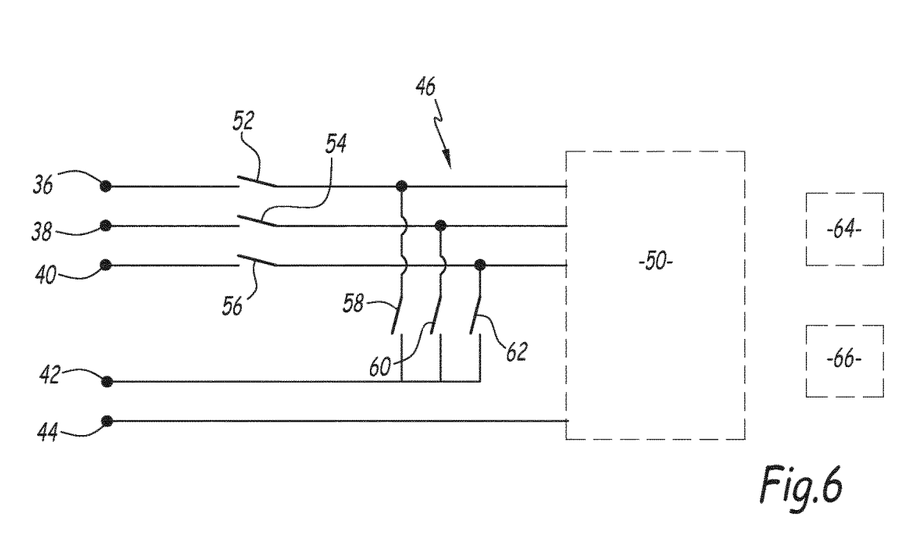
FIG. 6 is a simplified diagram of a switching unit of the power converter unit of FIG. 2.
Figure 7:
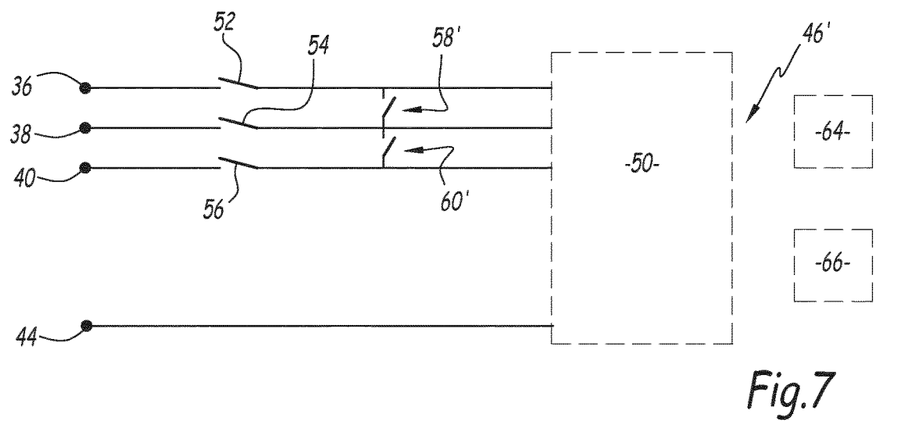
FIG. 7 illustrates an alternative embodiment of the switching unit of FIG. 6.

According to different embodiments, the switching unit 46 can be controlled electronically (e.g. by a control unit 64) or manually. Exemplary embodiments of the switching unit 46 are illustrated in FIGS. 6 and 7. Reference 50 is used to schematically illustrate the circuit 16 and the first input connection interface 10.

In the AC input/output mode, the first, second and third terminals 36, 38, 40 of the second connection interface 30 are disconnected from each other, forming separate input/output terminals for a three-phase AC voltage.

In the DC input/output mode, in which the first, second and third arms of the power converter circuit are electrically connected together, forming one DC input/output terminal.

In the DC input/output mode, the first, second and third terminals 36, 38 and 40 of the second connection interface 30 are electrically connected together, forming one DC input/output terminal.

Figure 3:
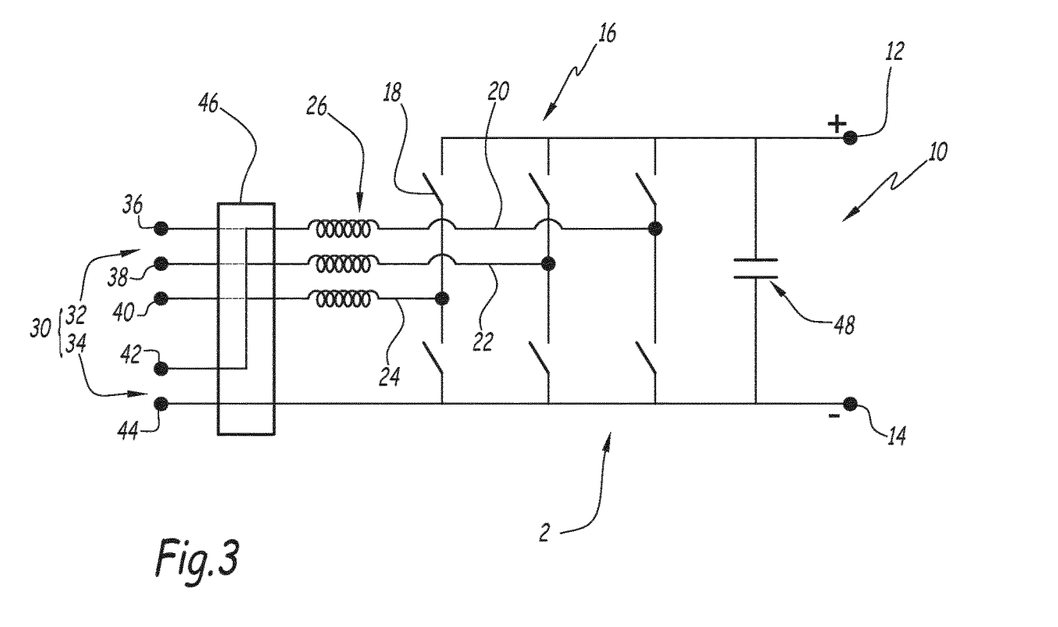
FIG. 3 illustrates the power converter unit of FIG. 2 in which a switching unit is in a particular state.

On therefore understands that the first group 32 of connection terminals is adapted to connect an AC electrical device to the second connection interface 30 and the second group 34 of connection terminals is adapted to connect, when the first group 32 of connection terminals is configured in the DC input/output mode, a DC electrical device to the second connection interface 30, as shown on FIG. 3. In the particular state of converter unit 2 illustrated on FIG. 3, the dotted lines indicate that terminals 36, 38 and 40 are disconnected from the terminal 42.

In this example, the terminal 44 is connected to the lead 14, forming a second DC input/output terminal in the DC input/output mode.

For example, as seen in FIG. 6, thanks to the switching unit 46, the terminal 42 is connected to the terminals 36, 38 and 40 (and to the first, second and third conductors) in the DC input/output mode and, preferably, is disconnected from the terminals 36, 38 and 40 (and from the first, second and third conductors) in the AC input/output mode. Any DC electrical device to be connected on the second connection interface 30 is preferably connected between the terminal 44 and the terminal 42.

With the terminal 42, the second group of terminals 34 can be used as a dedicated DC input/output. This can be used as a safety feature in order to avoid accidentally mixing DC and AC voltages on the second connection interface 30, no matter how the second electrical device is connected.

Optionally, the first connection interface 10 includes a capacitor 48 connected between leads 12 and 14, for smoothing the DC output voltage between leads 12 and 14.

In some embodiments, the switching unit 46 includes three electronic switches 58, 60, 62 adapted to be controlled by an electronic control unit 64, for example belonging to the power converter unit 2, in order to switch automatically between the AC and DC input/output modes.

In DC input/output modes, the first, second and third terminals 36, 38 and 40 (and the first, second and third conductors) are connected to the terminal 42 through switches 58, 60 and 62 which are in this case in an electrically passing state.

In some embodiments, as illustrated on FIG. 6, the switching unit 46 also includes additional switches 52, 54 and 56 for disconnecting terminals 36, 38 and 40 from the first, second and third conductors in the DC input/output mode. The additional switches 52, 54 and 56 act as a safety protection for insulating the terminals 36, 38 and 40 from the DC voltage applied between terminals 42 and 44 when the converter unit 2 is in the DC input/output mode.

In other words, the first, second and third connection terminals 36, 38 and 40 are able to be respectively connected to an end of the first, second and third arms 20, 22 and 24 of the power converter circuit yet are not necessarily permanently connected to the first, second and third arms 20, 22 and 24.

In such embodiments, the second connection interface 30 then preferably includes the terminal 42 described above, which, in the DC input/output, mode is connected to arms 20, 22 and 24 (and to first, second and third connections terminals) for forming a DC input/output terminal.

Preferably, the switches 52, 54 and 56 are by default in an electrically open state unless commanded differently.

The additional switches 52, 54 and 56 are optional and may be omitted in some embodiments.

One therefore understands that, in embodiments where additional switches 52, 54 and 56 are omitted, the terminals 36, 38 and 40 are permanently connected to the first, second and third arms of the circuit 16, respectively. In such embodiments, when the switching unit 46 is in the DC input/output mode, the first, second and third arms 36, 38 and 40 of the power converter circuit are electrically connected together, forming one DC input/output. This one DC input/output is electrically connected to at least one terminal of the second connection interface 30.

One therefore also understands that, in embodiments where additional switches 52, 54 and 56 are used, the terminals 36, 38 and 40 may be disconnected from to the first, second and third arms of the circuit 16, respectively. In that case, in the DC input/output mode, the first, second and third arms of the power converter circuit 16 are electrically connected together, forming one DC input/output, which in this case is connected to the terminal 42 in the DC input/output mode. The terminal 42 can however be disconnected from the first, second and third arms when in the AC input/output mode so as to avoid sending an AC phase on the DC terminal 42.

In some alternative embodiments of the switching unit 46, for example as shown on the switching unit 46' of FIG. 7, the terminal 42 can be omitted and the corresponding one DC terminal is formed by any one of the terminals 36, 38 and 40. In this case, any DC electrical device to be connected on the second connection interface 30 must then be connected between the terminal 44 and one of terminals 36, 38 and 40.

In embodiments where the terminal 42 is removed, then the switches 58, 60 and 62 are omitted. Instead, as shown on FIG. 7, electronic switches 58' and 60', that are similar to switches 58 and 60 and can be automatically controlled by an electronic control unit, are arranged so that a first electronic switch 58' of the switching unit 46' is connected between the first and second terminals 36, 38 (or between the first and second conductors) and a second electronic switch 60' is connected between the second and third terminals 38, 40 (or between the second and third conductors). The first and second electronic switches 58', 60' are in an electrically blocking state in the AC input/output mode and are in an electrically passing state in the DC input/output mode.

Optionally, the additional switches 52, 54 and 56 described above can be included in the switching unit 46'. However, these additional switches 52, 54 and 56 are then adapted to be controlled independently (e.g. by the control unit 64) so that, in the DC input/output mode, at least one of the additional switches 52, 54 and 56 remains closed so that at least one of the terminals 36, 38 and 40 of the first group 32 of terminals can be used as a DC input/output terminal.

Preferably, the additional switches 52, 54 and 56 described above are omitted from the switching unit 46'.

Figure 8:
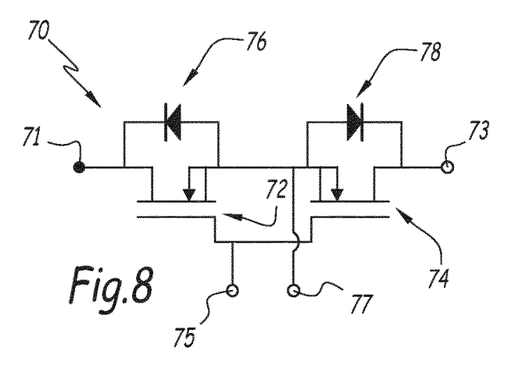
FIG. 8 illustrated an exemplary embodiment of an electronic switch for the switching unit of FIG. 6 or FIG. 7.

FIG. 8 illustrates an exemplary electronic switch unit 70 adapted to be used as any one of electronic switches 52, 54, 56, 58, 60 and 62. The switch unit 70 includes first and second identical transistors 72, 74 connected together in series between input/output electrodes 71 and 73. For example, transistors 72 and 74 are metal-oxide semiconductor field-effect transistors (MOSFET) connected together in series by their respective source electrode. A flyback diode 76, 78 is connected in parallel with each transistor 72, 74.

The electrode 75 is connected to the gates of transistors 72 and 74. The electrode 77 is connected to the source electrodes of transistors 72 and 74. The switch 70 can be controlled by applying a control signal between electrodes 75 and 77.

In alternative embodiments, other transistor technologies may be used, such as bipolar transistors. The structure of the electrical circuit connecting the transistors is adapted accordingly.

In some embodiments, the electronic switches are replaced by electro-mechanical relays.

According to some embodiments, when the switching unit 46 is meant to be operated automatically, then the switching unit 46 preferably also includes a voltage detection device 66 for detecting the voltage type applied on the second connection interface, i.e. to detect whether the second electrical device connected to the interface 30 is an AC device or a DC device.

In some examples, the voltage type is determined based on electrical measurements, for example using dedicated current or voltage probes.

In other embodiments, the voltage type is determined using mechanical detection devices, such as one or several contact switches. For example, the second electrical device is connected to the interface 30 using a dedicated plug and socket connection system having a specific, predefined shape depending on whether the second electrical device is meant to operate on AC or DC voltage. The mechanical detection device detects the shape of the plug during insertion in the socket.

The control unit 64 is then programmed to force the switching unit into the AC or DC input/output mode, or alternatively to prevent the switching unit from switching into the AC or DC input/output, mode based on the voltage type detected by the detection device 66.

Figure 9:
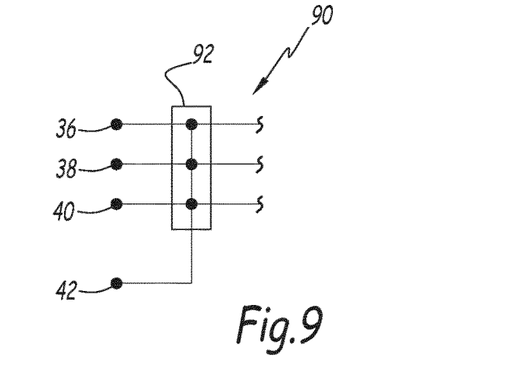
FIG. 9 is a simplified diagram of a power converter device including the power converter unit of FIG. 2 with a manually removable mechanical jumper.

FIG. 9 illustrates an alternative embodiment 90 of the switching unit 46 including a manually removable mechanical jumper 92 for connecting the first, second and third terminals 36, 38 and 40. In this case, the switching unit 46 is meant to be operated manually, for example in a factory setting during installation of the converter unit 2.

In the DC input/output mode, the jumper 92 is engaged with the first, second and third terminals 36, 38 and 40 while in the AC input/output mode, the jumper 92 removed from the first, second and third terminals 36, 38 and 40.

For example, the jumper 92 includes a main electrically conductive portion and an electrically insulating handling portion. The switching unit 90 includes a reception portion for receiving the jumper 92. Optionally, in embodiments where the terminal 42 is used, then the terminal 42 is electrically connected to the reception portion or is connected to an electrical ground of the vehicle 1.

Preferably, the jumper 92 is not meant to be removed when the converter unit 2 is powered. For example, the switching unit 90 includes means for preventing an user from removing the jumper 92 if the converter unit 2 is powered.

In an exemplary embodiment, the reception portion and the jumper 92 are enclosed in a protective housing closed by a removable lid. The switching unit 90 further includes a sensor, such as a contact switch, to detect whether the lid is open or closed. The sensor cooperates with an electronic circuit adapted to disconnect and/or shut down the first electrical device and/or the second device whenever the lid is opened.

In some other embodiments which are not illustrated, the switching unit 46 includes a mechanical switch, such as a rotary switch, for connecting the first, second and third terminals 36, 38 and 40 together in the DC input/output mode or, alternatively, for disconnecting the first, second and third terminals 36, 38 and 40 in the AC input/output mode.

The embodiments above therefore provide a power converter unit 2 which can be switched easily between an AC/DC converter mode and a DC/DC converter mode and therefore can be reconfigured depending on user requirements. The power converter unit 2 can be used as a building block for building larger and more complex power converter devices for replacing costlier low-volume application-specific power converter devices. Since the power converter unit 2 can be used in many different settings, it can be mass-produced in large quantities with a lower per-unit cost.

Figure 4:
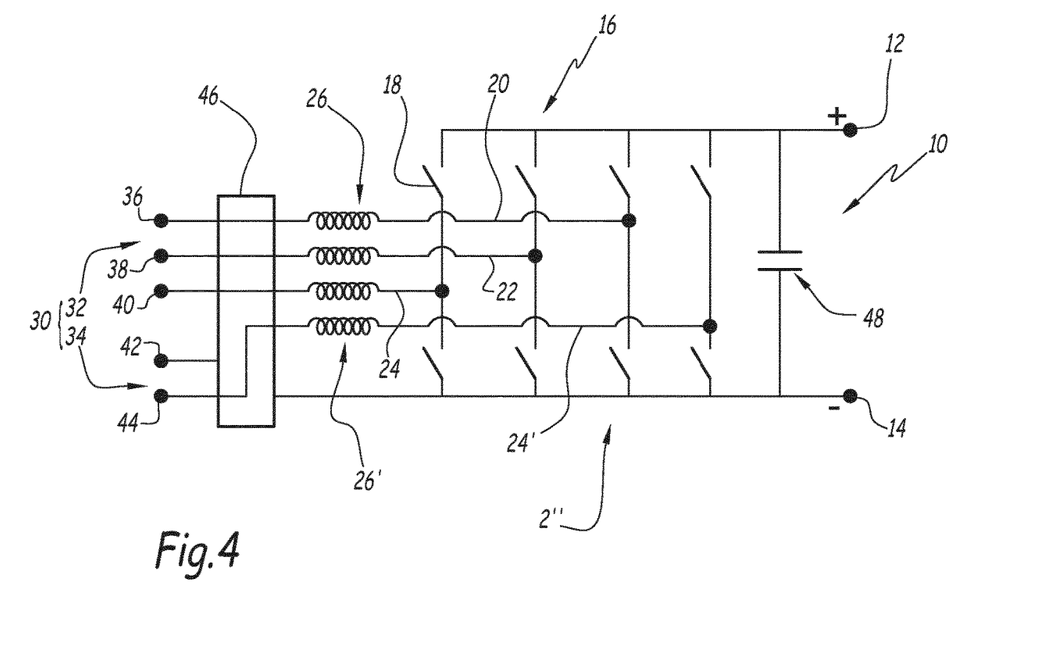
FIG. 4 and FIG. 5 illustrate alternative embodiments of the power converter of FIG. 2.

FIG. 4 illustrates an alternative embodiment of the power unit 2, bearing the reference 2", in which an additional arm 24' is added alongside arms 20, 22 and 24.

In this embodiment, the circuit 16 further includes an additional pair of switches 18. The additional arm 24' is connected between the terminal 44 a middle point of the additional pair of switches 18. The additional arm 24' may include an inductance coil 26' similar to inductance coils 26. Thanks to arm 24', the operation of the power converter unit is improved by providing a three-phase AC input with a neutral line. Except for these differences, everything disclosed in reference to the power converter unit 2 applies as well to the power converter unit 2".

Figure 5:
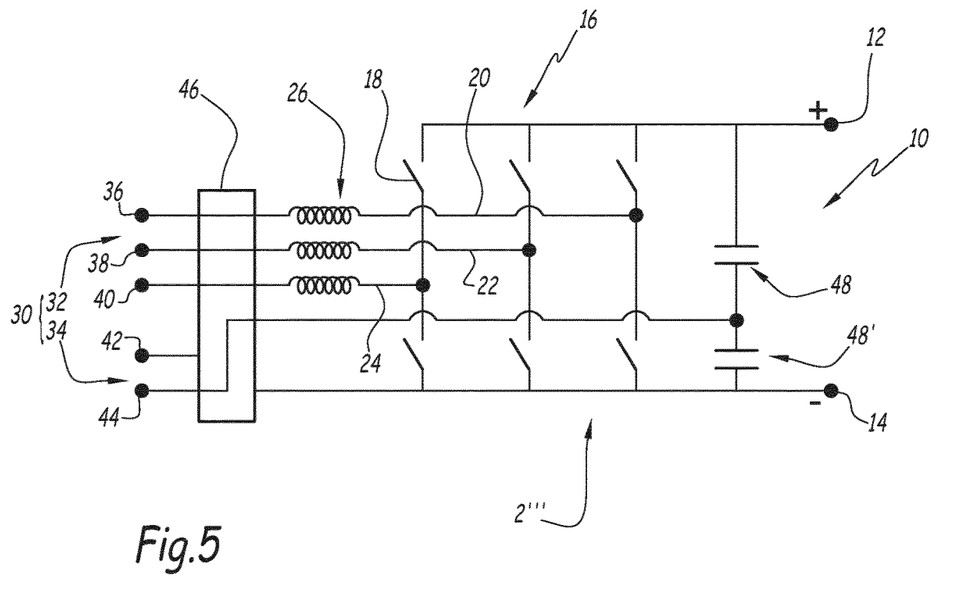

FIG. 5 illustrates an alternative embodiment of the power converter unit 2, bearing the reference 2'", in which an additional capacitor 48' is connected in series with capacitor 48 between leads 12 and 14 at the first connection interface 10, and in which the terminal 44 is connected to a middle point between the capacitors 48 and 48'. Thanks to this configuration, the terminal 44 is connected to a neutral connection line of the power converter unit 2'". Save for these differences, everything disclosed in reference to the power converter unit 2 applies as well to the power converter unit 2'".

Figures 10, 11:
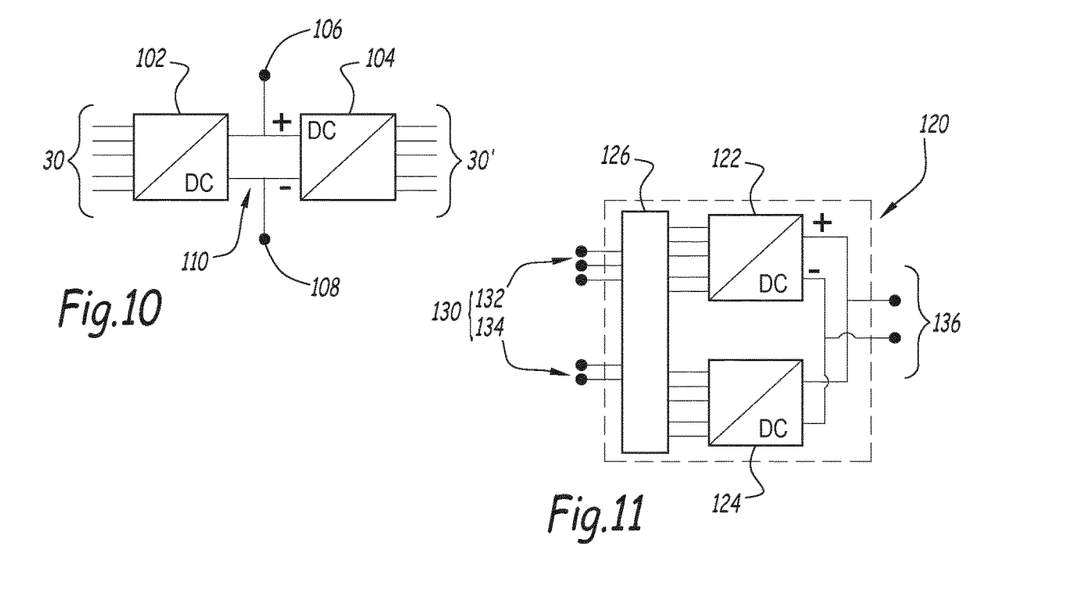
FIG. 10 is a simplified diagram of another power converter device including the power converter unit of FIG. 2.
FIG. 11 is a simplified diagram of yet another power converter device including the power converter unit of FIG. 2.

FIG. 10 illustrates an electrical power conversion device 100, including first and second power converter units 102, 104. Each power converter unit 102, 104 is similar to the power converter unit 2 previously described.

In this example, the respective first connection interfaces of first and second power converter units 102, 104 are of the DC type and their respective leads (comparable to leads 12 and 14) are connected together by a common DC bus 110.

In this particular example, the common DC bus 110 is accessible from outside the power conversion device 100 through terminals 106 and 108.

The second connection interface 30 of power converter unit 102 and the second connection interface 30' of power converter unit 104 are each adapted to switch between AC or DC input/output modes.

In some embodiments, not illustrated, the respective terminals of the second connection interfaces 30, 30' are connected with each other.

The power conversion device 100 may be used as a battery charger powered by a power grid, especially if the battery to be charged has a voltage lower than the rectified grid voltage. For example, the first and second power converter units 102, 104 operate respectively as an active AC/DC rectifier and a DC/DC converter. The grid is connected to interface 30 and the battery is connected to interface 30'.

As an example, the three-phase grid voltage is rated at 400 V AC. The first power converter 102 delivers a DC voltage in the 540V-900V DC range on the DC bus 110. The second power converter 104 operates as a step-down converter supplying a lower DC voltage to the battery.

It is also possible to use the power conversion device 100 for charging a battery which has a voltage higher than the rectified grid voltage, by connecting the battery to the DC bus 110 between terminals 106 and 108. For example, the first power converter may be used as a reversible AC/DC converter (active rectifier or inverter) and the second power converter unit 104 may operate as a DC/DC converter to supply a load.

Since the power conversion device 100 is reversible, the above explanation is also applicable to embodiments where the battery is used to power an AC grid, such as an internal power distribution network of the vehicle 1 connected to the interface 30.

FIG. 11 illustrates an embodiment of a power conversion device 120 including first and second power converter units 122 and 124, where each power converter unit 122 and 124 is similar to the power converter unit 2.

For example, the respective first connection interfaces of second power converter units 122 and 124 are of the DC type and are connected together by a common DC bus 125.

The respective second connection interfaces, each including a switching unit 46, are connected to an additional switching unit 126. Said additional switching unit 126 is adapted to switch, in response to a command signal, between first and second states.

In the first state, the respective second connection interfaces of the first and second power converter units 122 and 124 are connected in parallel, the additional switching unit forming a common connection input/output interface 130 being adapted to be connected to a single electrical device.

In the second state, the respective second connection interfaces of the first and second power converter units 122 and 124 are disconnected from each other and each can be connected to an electrical device.

For example, the common connection input/output interface 130 includes a first group 132 of AC terminals and a second group 134 of DC terminals, so that the single electrical device can be of the AC type or the DC type. The respective switching units 48 are coupled so as to be simultaneously in the same AC or DC input/output mode.

In some embodiments, the first and second power converter units are part of an integrated module, for example encapsulated in an enclosure. Additional connection terminals 136 are connected to the respective first connection interfaces of the first and second power converter units 122, 124 and are accessible from outside the integrated module.

In particular embodiments, the power conversion device 120 may be used in a similar fashion as power conversion device 100, with the difference that the power converter units 122 and 124 are also able to operate in parallel, or be disconnected from other to operate independently. When connected in parallel, the power delivered on their respective DC output may be cumulated, i.e. the total DC output voltage of the power conversion device 120 is equal to the sum of the DC output voltage of the power converter units 122 and 124.

The power conversion device 120 is also reversible and the advantages described above can also be applied to the present embodiments.

Figure 12:
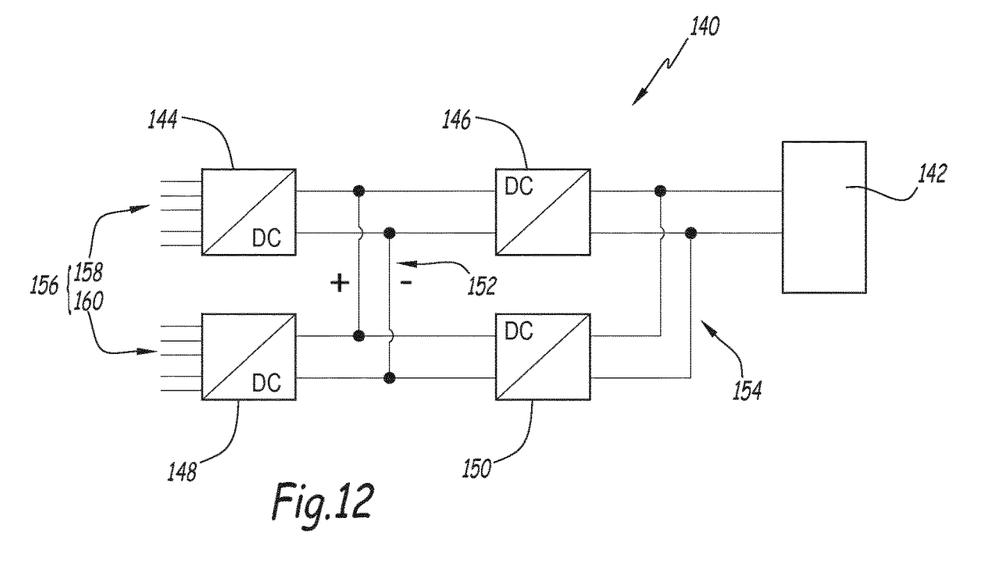
FIG. 12 is a simplified diagram of yet another power converter device including the power converter unit of FIG. 2.

FIG. 12 illustrates another embodiment of an electrical power conversion device 140 connected to a first electrical device 142.

The device 140 includes first, second, third and fourth power converter units 144, 146, 148 and 150 each being similar to power conversion unit 2.

For example, the first connection interfaces of the power converter units 144, 146, 148 and 150 are of the DC type and are all connected to a same common DC electrical bus 152.

In other words, the power converter units 144, 146, 148 and 150 are connected together by their first DC connection interfaces.

Additionally, the second connection interfaces of power converter units 146 and 150 can be connected together for forming a common output 154 which can be of the AC or DC type depending on the configuration of the switching unit 48 of the power converter units 146 and 150.

An input 156 of device 140 includes the respective second connection interfaces 158 and 160 of power converter units 144 and 148, for connecting second electrical devices of the AC or DC types.

With this architecture and thanks to the common DC bus 152, the power flow circulating inside the converter device 140 during operation can be optimized.

The power conversion device 140 may be used in a similar fashion as power conversion device 100 or 120, with the difference that it includes four power converter units instead of two.

For example, the power conversion device 140 may be used as a battery charger delivering twice as much power as device 100 (the battery then being the first device 142) when all four converter units 146-150 are active.

In particular embodiments, power converter units 146-150 may be operated independently from each other, for example with units 144 and 146 operated in the same way as units 102 and 104 of device 100 while unit 148 would be used as an output and unit 150 being almost inactive (the battery then being connected to the interface 160).

When interface 158 is used as an input and interface 160 is used as an output, then the common DC bus 152 provides a direct path between units 144 and 148, reducing the amount of power losses.

The power conversion device 140 is also reversible and the advantages described above can also be applied to the present embodiments.

Figure 13:
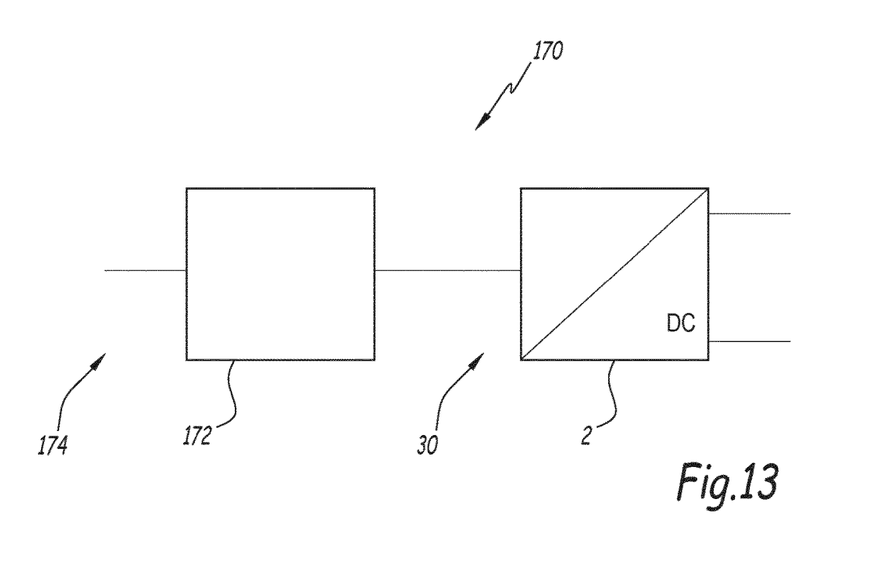
FIG. 13 is a simplified diagram of a power converter associated to a galvanic insolation device.

FIG. 13 illustrates an embodiment 170 in which the power converter unit 2 is associated with a galvanic isolation device 172 comprising an input 174 meant to be connected to the second electrical device and an output connected to the second connection interface 30. In other words, the second electrical device is connected to the second connection interface 30 through the galvanic isolation device 172.

In practice, the galvanic isolation device 172 might be connected instead to the first interface 10, e.g. between the power converter unit 2 and the first electrical device.

It is to be understood that the diagram of FIG. 13 is given for illustrative purposes only and does not preclude any implementation of the galvanic isolation device 172.

In practice, in some embodiments, the galvanic isolation device 172 may be unable to switch seamlessly between AC and DC modes, meaning that the galvanic isolation device 172 must then be connected to an adequate input or output of the converter 2 where it will receive only one kind of voltage (either DC or AC). For example, the galvanic isolation device 172 may be connected to a DC input of a converter unit 2, or on a common DC bus between two DC converters.

It follows from the above examples and embodiments of devices 100, 120 and 140 that the converter unit 2 (and its alternative embodiments) can be used in many different configurations.

The embodiments of the power converter unit 2 described above can be included in a vehicle electrical system including at least one current source and at least one electrical load connected to the current source through the electrical circuit and the power converter unit 2. For example, the first and second electrical devices correspond to the current source and the electrical load.

The embodiments and alternatives described above may be combined with each other in order to generate new embodiments of the invention.

The invention claimed is:

1. An electrical power converter unit, including:
  a first connection interface including two leads forming a DC input/output interface for connecting a first electrical device to the power converter unit;
  a three-phase rectifier power converter circuit including:
    six switches connected by pairs, the pairs of switches being connected in parallel between the two leads of the first connection interface,
    first, second and third arms each connected to a middle point of a pair of switches;
  a second connection interface for connecting a second electrical device to the power converter unit, the second connection interface including first, second and third connection terminals respectively connected to an end of the first, second and third arms of the power converter circuit;
wherein the second connection interface includes a switching unit adapted to switch between:
  a DC input/output mode, in which the first, second and third arms of the power converter circuit are electrically connected together, forming one DC input/output; and
  an AC input/output mode, in which the first, second and third terminals of the second connection interface are disconnected from each other, forming separate input/output terminals for a three-phase AC voltage,
  wherein the switching unit includes electronic switches and is adapted to be controlled by an electronical control unit in order to switch between the AC and DC input/output modes,
  wherein the first terminal is connected to an end of the first arm through a first electrical conductor, the second terminal is connected to an end of the second arm through a second electrical conductor and the third terminal is connected to an end of the third arm through a third electrical conductor,
  and wherein a first electronic switch of the switching unit is connected between the first and second terminals or between the first and second conductors or between the first arm and the second arm, and a second electronic switch is connected between the second and third terminals or between the second and third conductors, or between the second arm and the third arm, the first and second electronic switches being in an electrically blocking state in the AC input/output mode and are in an electrically passing state in the DC input/output mode.

2. The power converter unit of claim 1, wherein the switching unit includes a manually removable mechanical jumper for connecting the first, second and third terminals or arms, the jumper being engaged with the first, second and third terminals or arms in the DC input/output mode and being removed from the first, second and third terminals or arms in the AC input/output mode.

3. The power converter unit of claim 1, wherein the switching unit includes a mechanical switch for connecting the first, second and third terminals or arms together or, alternatively, for disconnecting the first, second and third terminals arms.

4. The power converter unit of claim 1, wherein: the first terminal is connected to an end of the first arm through a first electrical conductor, the second terminal is connected to an end of the second arm through a second electrical conductor and the third terminal is connected to an end of the third arm through a third electrical conductor, wherein the second connection interface includes a fourth connection terminal, and wherein the switching unit includes a first electronic switch, a second electronic switch and a third electronic switch, the first electronic switch being between the fourth terminal and the first connection terminal or the first electrical conductor or the second arm, the second electronic switch being between the fourth terminal and the second connection terminal or the second electrical conductor or the second arm, the third electronic switch being between the fourth terminal and the third connection terminal or the third electrical conductor or the third arm.

5. The power converter unit of any of claim 1, wherein the switching unit includes a voltage detection device for detecting the voltage type applied on the second connection interface, and wherein a control unit of the power converter unit is programmed to force the switching unit into the AC or DC input/output mode or to prevent the switching unit from switching into the AC or DC input/output mode based on the detected voltage type.

6. The power converter unit according to claim 1, wherein the power conversion circuit further includes a neutral connection line connected to a middle point of a pair of capacitors connected between the DC input/output terminals, in parallel with the pairs of switches, the neutral connection line being connected to an additional terminal of the second connection interface.

7. The power converter unit according to claim 1, wherein the power converter unit is associated with a galvanic isolation device connected to the first connection interface or to the second connection interface, the first or second electrical device being adapted to be connected to the corresponding first or second connection interface through the galvanic isolation device.

8. The power converter unit according to claim 1, wherein the second connection interface includes a fourth connection terminal connected to one of the leads of the first interface and forming a second DC input/output terminal in the DC input/output mode.

9. An electrical power conversion device, including a first power converter unit according to claim 1 and a second power converter unit according to claim 1, each power converter unit comprising first and second connection interfaces, each first connection interface being DC type, the first connection interfaces of the first power converter unit being connected to the first convection interface of the second power converter unit.

10. The electrical power conversion device of claim 9, wherein additional connection terminals are connected to the respective first connection interfaces of the first and second power converter units, and wherein the first and second power converter units are part of an integrated module, the additional connection terminals being accessible from outside the integrated module.

11. The electrical power conversion device according to claim 9, wherein the power conversion device further includes an additional switching unit connected to the respective switching units of the first and second power converter units, and wherein the additional switching unit is adapted to switch, in response to a command signal, between: a first state, in which the respective second connection interfaces of the first and second power converter units are connected in parallel, the additional switching unit forming a common connection input/output interface being adapted to be connected to an electrical device, and a second state, in which the respective second connection interfaces of the first and second power converter units are disconnected from each other.

12. The electrical power conversion device according to claim 9, wherein the respective terminals of the second connection interfaces are connected with each other.

13. An electrical power conversion device, including a first power converter unit according to claim 1, a second power converter unit according to claim 1, a third power converter unit according to claim 1 and a fourth power converter unit according to claim 1, each power converter unit comprising first and second connection interfaces, each first connection interface being DC type, the first connection interfaces being connected to a same common DC electrical bus.

14. A vehicle electrical system comprising an electrical circuit including a power converter unit according to claim 1, at least one current source, at least one electrical load connected to said current source through the electrical circuit and said power converter unit.

15. An industrial vehicle, preferably a wheeled industrial vehicle, comprising an electrical circuit including a power converter unit according to claim 1.

* * * * *